Aug. 11, 1942.      G. C. ZACHAE      2,292,730

ELECTRICAL TESTING DEVICE

Filed March 12, 1941

Inventor:
Gottfried Carl Zachae
By Charles A. Warren
Attorney

Patented Aug. 11, 1942

2,292,730

UNITED STATES PATENT OFFICE 2,292,730

ELECTRICAL TESTING DEVICE

Gottfried Carl Zachae, Norwich, Conn.

Application March 12, 1941, Serial No. 382,967

5 Claims. (Cl. 175—183)

The present invention relates to an electrical testing device especially adapted for use by electricians in testing bulbs, fuses and wire connections.

In prior devices of this character, the testing device has consisted of a permanent mounting connected to the power supply for testing fuses, light bulbs and the like without the presence of a source of conventional power supply. One of the principal objects of the present invention is to provide a convenient and readily portable device for the testing of electrical equipment.

Where an electrician must work with circuits which are temporarily disconnected from the power supply, a magneto set has been used in testing the several circuits to make sure that they are complete and properly installed. A further feature of the present invention is an arrangement by which the magneto set may be eliminated and the battery power from a conventional flashlight utilized for testing the circuits.

Practically any electrician engaged in industrial or domestic wiring is equipped with a standard type flashlight which is frequently necessary in dark places or when the conventional source of power is disconnected. The present invention involves as a testing device a mechanism which may be mounted on and will form a part of a conventional flashlight to be used in testing of electrical devices that the electrician may encounter.

Other and further objects and advantages of the invention will more fully appear from the following detailed description taken in connection with the accompanying drawing, in which—

Figure 1:
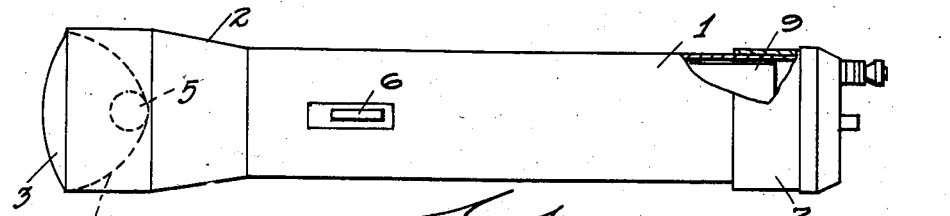
Fig. 1 is a side elevation of a flashlight on which is mounted an electrical testing device embodying the invention.

With reference first to Fig. 1, the flashlight shown is conventional in character and has a tubular shell 1, on one end of which is mounted a cap 2 which supports the lens 3 and holds in place the reflector 4. A bulb 5 is mounted in the reflector and the shell has on the side thereof a switch 6, by which the light in the bulb may be turned on and off. The particular structure of the flashlight is not important; the device of the invention may be attached to any conventional flashlight incorporating the foregoing elements, and having the circuit through the bulb and battery completed by a cap 7 on the bottom of the flashlight, with the cap supporting a spring 8 which engages the base of the battery 9 within the flashlight.

Figures 2, 5:
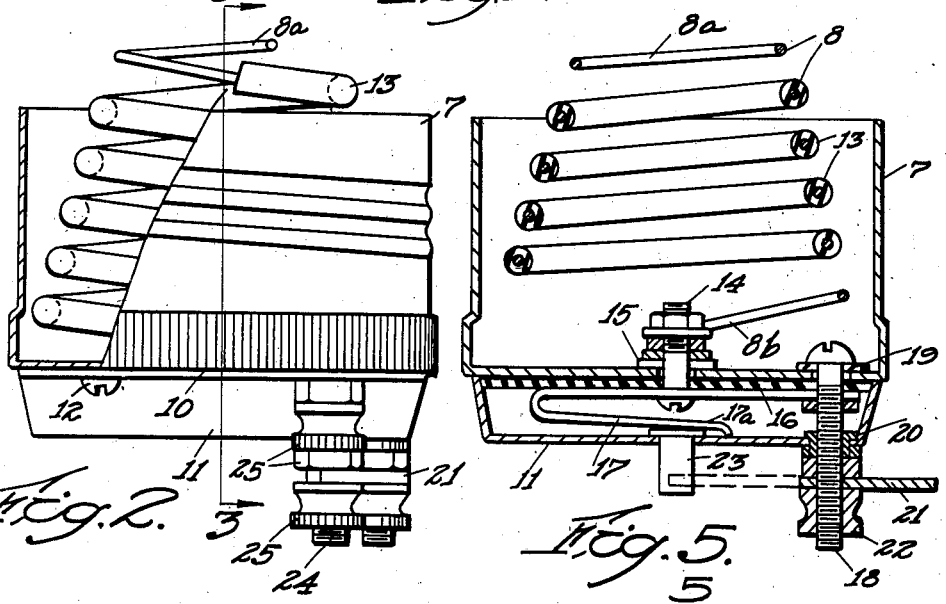
Fig. 2 is a side elevation of the attachment of Fig. 1.
Fig. 5 is a sectional view of the device at right angles to the section of Fig. 3.
Figures 3, 4:
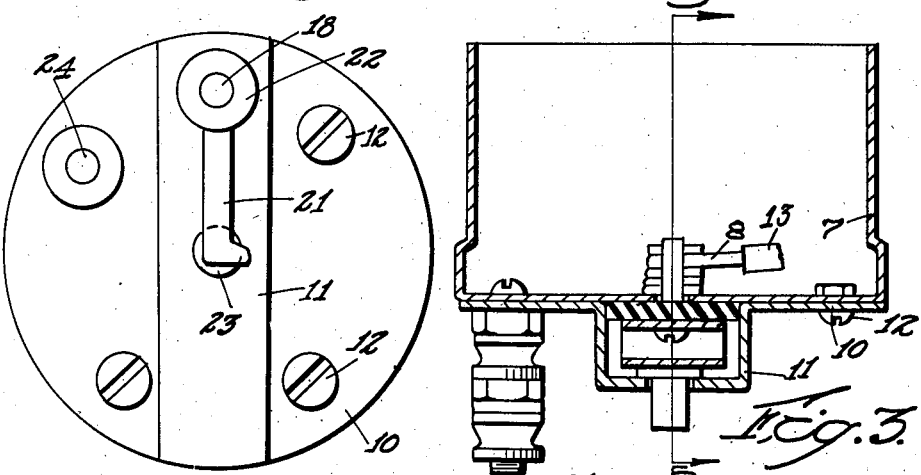
Fig. 3 is a sectional view along the line 3—3 of Fig. 2.
Fig. 4 is a view of the bottom of the device.

The device of the invention is mounted on a conventional flashlight by removal of the usual bottom cap and replacement with the cap 7 on which is mounted as shown the testing device. Referring now to Figs. 2 and 3, the cap 7 has attached to the bottom thereof a disk 10 having an offset central portion 11, as shown. The disk is permanently secured, as by screws 12, to the cap 7 for a good electrical connection therebetween. The spring 8, except for the end 8a thereof, which engages with the end of the flashlight cell or battery, is insulated as at 13 to avoid engagement between the spring wire and the cap. The lower end 8b of the spring 8 is secured to a screw 14 extending through an opening centrally of the cap and suitably insulated from the cap as by an insulating disk 15 inside the cap 7 and an insulating strip 16 outside the cap.

A spring strip or contact 17 normally in the position shown in Fig. 2, is held against the insulating strip 16 by the head of the screw 14, which head is in a position to engage with the rebent end 17a of the strip. The extreme end of the strip is normally in engagement with the central offset portion 11 of the disk 10. In this position, a circuit is completed through the batteries of the flashlight to the disk 10 and thence to the bottom cap 7, so that the flashlight will function in the usual way when the switch 6 is operated.

An elongated screw 18 extends outwardly from the cap 7, being insulated therefrom by a washer 19 and the strip 16 through which the screw also extends. An insulating washer 20 insulates screw 18 from the offset portion 11 of the disk 10. The screw 18 acts as a binding post and has a latch 21 thereon which may be locked against turning by a knurled nut 22. The latch is so located that it may, when desired, extend over and keep depressed a push button 23. This button, located centrally of the disk 10 engages the end 17a of the contact strip to cause it to engage the head of the screw 14.

In operation, it will be understood that the flashlight will operate in the usual way when the cap and its attached mechanism is positioned thereon, since the strip or contact 17 normally establishes an electrical connection between the spring 8 and the cap 7 through the screw 14 and disk 10. When testing a screw fuse, the latter is placed so that one of the terminals, as for example, the central terminal, engages the cap 7 or shell of the flashlight and so that the other terminal, in this case the shell of the fuse, engages the end of the latch 21, the latter, at this time being locked to extend outwardly from the base or cap 7. With the fuse in this position, the button 23 is pressed and if the fuse is good, the bulb in the flashlight will continue to be lighted, since the circuit is completed through the contact 17, the screw 18, the latch 21 and the fuse to the cap 7. Obviously, if the fuse is burned out, the flashlight bulb will not light when the button is pressed.

The same test may be used for a cartridge fuse by holding the fuse so that one end engages the latch 21 and the other end engages the shell 1 or cap 7 of the flashlight, and then operating the push button 23. If the fuse is not burned out, the circuit will be completed through the strip 17 and the fuse, so that the flashlight bulb will be lighted. The test is equally effective where the two contacts of the plug or cartridge fuse are brought into engagement respectively with a part of the screw 18, and a second screw or binding post 24, which is in electrical contact with the disk 10. Where the two elongated screws or binding posts 18 and 24 are used for the two contacts of the testing device, the latch 21 need not be utilized, but will be so positioned that it does not accidentally make a connection between the two binding posts. Where a large number of fuses, bulbs or the like are to be tested at one time, or where the testing apparatus is used in such a way that it would be advantageous to have the push button 23 held down all the time, the latch 21 is so arranged, as shown in Fig. 4 and in dotted lines in Fig. 5, so that it extends over the end of the push button and will hold the push button down when the outermost nuts on the screw 18 on which the latch is pivoted, are tightened. This latch thus acts in effect as a depressor for the push button, leaving both hands of the tester available for manipulating the remainder of the testing device.

The same form of testing apparatus is useful in testing electric light bulbs, particularly low voltage lights, by holding the shell or threaded metallic portion of the bulb against the latch 21, and with the central contact of the bulb engaging the shell 7. Pressure on the button 23 will then complete a circuit to slightly illuminate the light bulb being tested, or the flashlight bulb if the bulb being tested is in a usable condition.

Other uses of the testing device will readily be apparent, as for example, in the testing of an electrical circuit to see whether it is shorted. For example. one of the two wires of the circuit which is believed to be shorted is connected to the screw or binding post 18 and the other wire is connected to the second binding post 24 in electrical contact with the disk 10. The button 23 is then pushed, and if there is a short circuit, the flashlight bulb will light. This test is obviously more satisfactory than, and of equal value to, the test of such a circuit by applying the conventional power supply thereto with a safety fuse inserted to protect the wire.

Other tests of electrical equipment utilizing the above device will be readily apparent to anyone familiar with various types of electrical equipment. For example, in testing the fields of electric motors, the terminals of each winding may be successively connected to the two binding posts of the device and the polarity of each winding, while connected to the device, tested by a small compass. This test is of particular advantage in locating a winding of reversed polarity in a motor.

The tester is also useful in phasing-out a motor, where it is essential that selected windings in the motor's field be connected to certain wires of the power supply. The compass will tell whether each coil is properly connected to insure satisfactory operation of the motor at maximum efficiency. The tester will also locate short circuits or grounds in the field windings, as will be apparent.

Wherever the test involves a connection of the tester by lead wires to the electrical equipment being tested, the leads may be secured to the tester by the knurled nut 22 on the binding post 18 and by similar nuts 25 on the binding post 24. When the tester is not used as such the latch may be locked in the position of Fig. 2 in which it extends between the two binding posts and is held in place by the clamping nuts thereon.

Similarly, the armatures of motors may be tested for grounds, short circuits, or open wires in which a break in the wires or a short circuit in the armature may be located by utilizing a telephone receiver in conjunction with the tester, a buzzer being put in the circuit to provide for a rapid making and breaking of the circuit. Variations in tests of this character will be readily apparent.

For use in testing domestic wiring, or in the testing of domestic equipment, the tester is of particular value, since it may readily be used for the testing of bulbs and fuses, as above described, or in the testing of circuits for breaks or short circuits or grounds, or in the testing of fixtures to make sure that the proper wires of the fixture are connected to the corresponding wires of the house circuit.

It will be understood that the foregoing by no means exhausts the possibilities of this device as an electrical tester as many other tests may be carried out where it is desirable to apply to a circuit or winding or the like, a small voltage which cannot damage the electrical equipment, but which will nevertheless provide for proper testing of the equipment for defects.

I claim:

1. In a testing device for attachment to a flashlight, a cap adapted to fit on the end of the flashlight, a spring within the cap for engagement with a battery in the flashlight, a binding post extending from said cap and insulated therefrom, a switch mounted on said cap and adapted to make a connection from said spring to said post, and a button for operating said switch, said binding post having a latch thereon adapted to extend over the switch button to hold the button depressed.

2. In a testing device for attachment to a flashlight, a cap adapted to fit on the end of the flashlight, a spring within the cap for engagement with a battery in the flashlight and insulated from said cap, a binding post extending from said cap and insulated therefrom, a switch mounted on said cap and normally making a connection from said spring to said cap, and means for actuating said switch to break the normal connection from the spring to the cap, said spring and the binding post being electrically connected and said binding post having mounted thereon a pivoted latch engageable with said actuating means to hold the switch in a position to break the normal connection between the spring and the cap established by the switch.

3. In a testing device for attachment to a flashlight, a cap adapted to fit on the end of the flashlight, a spring within the cap for engagement with a battery in the flashlight and insulated from said cap, a binding post extending from said cap and insulated therefrom, a switch mounted on said cap and normally making a connection from said spring to said cap, means for actuating said switch to break the normal connection from the spring to the cap, said spring and the binding post being electrically connected, a second binding post extending from the cap and in electrical contact therewith and a latch mounted on one of said binding posts and adapted to extend over and engage said actuating means.

4. In a testing device for attachment to a flashlight, a cap adapted to fit on the end of the flashlight, a spring within the cap for engagement with a battery in the flashlight and insulated from said cap, a binding post extending from said cap and insulated therefrom, a switch mounted on said cap and normally making a connection from said spring to said cap, means for actuating said switch to break the normal connection from the spring to the cap, said spring and the binding post being electrically connected, a second binding post extending from the cap and in electrical contact therewith and a latch mounted on one of said binding posts and adapted to extend over and engage said actuating means, said latch thereby holding the switch in a predetermined position.

5. In a testing device for attachment to a flashlight, a cap adapted to fit on the end of the flashlight, a spring within the cap for engagement with a battery in the flashlight and insulated from said cap, a binding post extending from said cap and insulated therefrom, a switch mounted on said cap and normally making a connection from said spring to said cap, means for actuating said switch to break the normal connection from the spring to the cap, said spring and the binding post being electrically connected, a second binding post extending from the cap and in electrical contact therewith and a latch mounted on one of said binding posts and adapted to extend between said posts for making an electrical connection therebetween.

GOTTFRIED CARL ZACHAE.